(No Model.)
R. H. BEACH.
COMBINED ELECTRIC MOTOR AND LAMP SOCKET.
No. 444,807.  Patented Jan. 20, 1891.
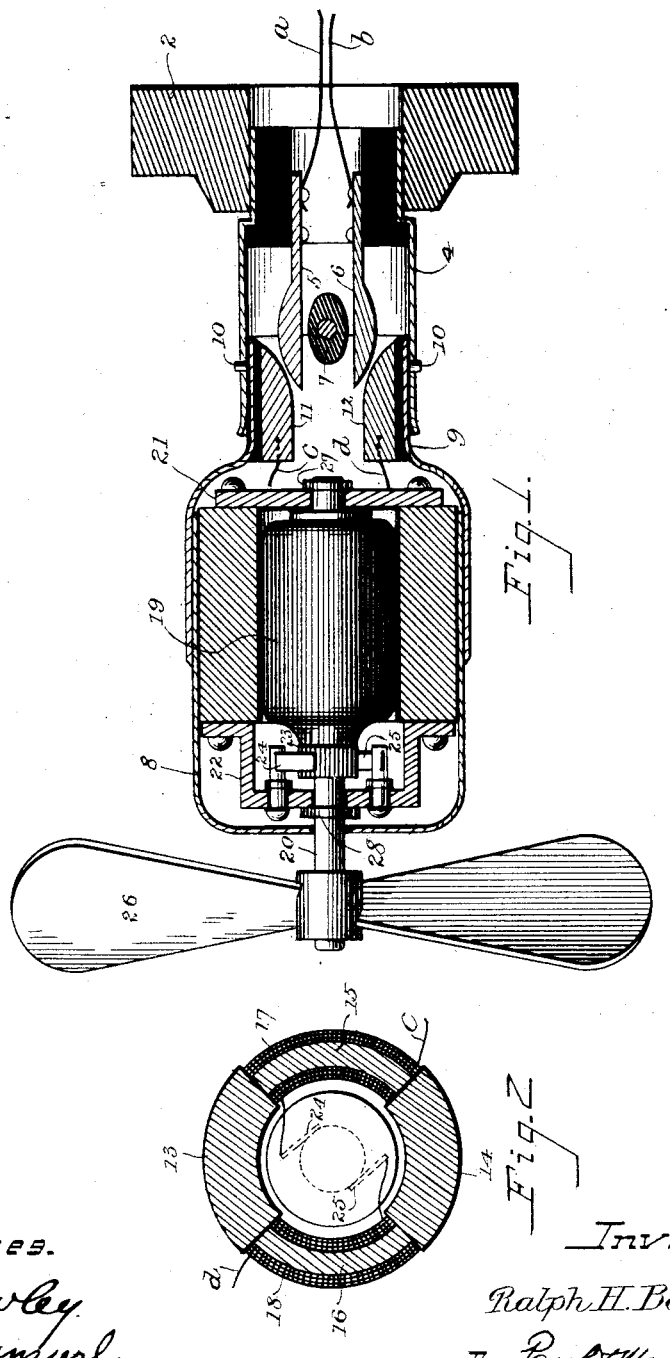
Witnesses.
O. L. Hawley
L. S. Nrunzurl
Inventor.
Ralph H. Beach,
By Paul & Mumum Attys.

UNITED STATES PATENT OFFICE.

RALPH H. BEACH, OF ST. PAUL, MINNESOTA, ASSIGNOR, BY DIRECT AND MESNE ASSIGNMENTS, TO HIMSELF AND WARREN CARPENTER, OF SAME PLACE.

COMBINED ELECTRIC MOTOR AND LAMP-SOCKET.

SPECIFICATION forming part of Letters Patent No. 444,807, dated January 20, 1891.

Application filed August 21, 1890. Serial No. 362,598. (No model.)

*To all whom it may concern:*

Be it known that I, RALPH H. BEACH, of St. Paul, Ramsey county, Minnesota, have invented certain Improvements in a Combined Electric Motor and Lamp-Socket, of which the following is a specification.

My invention relates to improvements in electric motors, particularly to that type known as "fan-motors," which are used to produce currents of air for purposes of ventilation, its object being to provide a motor so constructed that it may be inserted into the socket of an incandescent lamp in the same manner as a lamp, so as to be brought into connection with and operated by the current of the line-wires in the same manner as the lamp without other connections or attachments.

To this end my invention consists in arranging a small compact motor within a suitable case to protect the parts and to make it convenient for handling, one end of said case being formed to slip into a lamp-socket in the same manner as the base of the lamp and fitted with fixed terminals for the working-current wires of the motor, which will be in proper position when the motor is fixed in the socket to be connected by means of the switch of the socket with its line-wires, so as to direct the current from said wires through the motor in the same manner as it would be carried through the filament of the lamp in like position.

My invention further consists in the construction and combination hereinafter described, and particularly pointed out in the claims.

In the accompanying drawings, forming part of this specification, Figure 1 is a longitudinal section of a lamp-socket and my improved motor, shown as a fan-motor, inserted therein in position to receive the current when the switch is turned. Fig. 2 is a detail cross-section of the field-magnets of the motor, showing the windings of the cores of the magnets and the brush connections.

In the drawings, 2 represents a rosette or bracket adapted to be secured to any suitable support and provided with the lamp-socket 4 of common form. As shown, the socket is fitted with spring-terminals 5 and 6, to which are connected the line-wires $a$ and $b$. A switch or button 7, arranged between the terminals, is adapted to spread them, so as to bring them into contact with the terminals of the lamp.

8 is a cylindrical brass case, having the narrowed end 9 of proper dimensions to be slipped into the socket 4 in the same manner as the base of the lamp and there secured by means of the studs 10, engaging the walls of the socket in the ordinary manner. Arranged within this narrowed end 9, but insulated therefrom in the usual manner, are the terminals 11 and 12, arranged in the same manner as in the base of a lamp, and having the wires $c$ and $d$ leading to the coils of the field-magnets of the motor.

This motor may be of any preferred form; but I prefer that herein shown, having the curved field-magnets 13 and 14 arranged within the case 8, connected by the cores 15 and 16 and forming a ring. Upon these cores are wound the coils 17 and 18, which coils are connected, respectively, to the wires $c$ and $d$, leading to the terminals 11 and 12. The armature 19 is arranged between the field-magnets in the ordinary manner, its shaft 20 being supported in suitable bearings, as in the cross-bar 21 and yoke 22, of non-magnetic metal, secured upon either end of the field-magnets. The armature is fitted in the usual manner with the commutator 23, upon which bear brushes 24 and 25, which are electrically connected, respectively, with the coils 17 and 18 of the field-magnets and have insulated support upon the yoke 22. Upon the projecting end of the shaft 20 is secured the fan 26, which is driven by the rotation of the shaft. In order to prevent longitudinal movement of the shaft in its bearings, I prefer to arrange shoulders or stops 27 and 28 upon the shaft to bear against the bar 21 and yoke 22, respectively, and thus hold the armature in proper position, no matter what the position of the motor may be when placed in the socket. By this means the motor can be held at any angle between the horizontal and vertical positions, according to the work it is to do or the position of the socket.

The motor may be substituted at will for the lamp, and is operated or stopped by merely turning the switch of the socket.

It is obvious that the motor may be adapted to various uses by making suitable attachments or connections to the shaft.

I claim—

1. The combination of an incandescent-lamp socket and an electric motor formed with an extension to fit to said socket and provided with working-line terminals with which the wire terminals of the socket make contact, said motor and socket being separable from each other, substantially as described.

2. The combination of an electric motor, an inclosing case therefor having a cylindrical end or neck adapted to fit into an incandescent-lamp socket, and fixed terminals for the working-current wires of the motor, so arranged in said end that when the motor-case is inserted into a socket the line-wires of the socket can be switched into electrical connection with said terminals, substantially as and for the purposes set forth.

3. The combination, with an incandescent-lamp socket, of an electric motor, a fan upon its armature-shaft, a case inclosing said motor, having a cylindrical end adapted to fit into said socket, and fixed terminals for the working-wires of said motor, so arranged that when the motor is in place in the socket the line-wires of the socket can be switched into connection with the motor-terminals, substantially as and for the purposes set forth.

4. The combination, with the lamp-socket 4, having the line-wire terminals 5 and 6 and the switch 7, of the motor having the armature 19, the commutator 23, brushes 24 and 25, field-magnets 13 and 14, having the connecting-cores 15 and 16 and the coils 17 and 18 arranged upon said cores and connected with said brushes, the fan 26 upon the shaft of the armature, the inclosing case 8, having the narrowed end 9 adapted to fit into said socket, and the terminals 11 and 12, arranged in said narrowed end and electrically connected, respectively, with the coils 17 and 18, substantially as and for the purposes set forth.

In testimony whereof I hereto set my hand this 18th day of August, 1890.

RALPH H. BEACH.

In presence of—
 L. S. WEINZIERL,
 A. MAC WELCH.